US008960720B2

(12) United States Patent
Hojo et al.

(10) Patent No.: US 8,960,720 B2
(45) Date of Patent: Feb. 24, 2015

(54) HELMET HOLDER ATTACHMENT STRUCTURE OF SADDLE-RIDE TYPE VEHICLE

(71) Applicant: Honda Motor Co., Ltd., Tokyo (JP)

(72) Inventors: Masayuki Hojo, Wako (JP); Akira Omae, Wako (JP); Hiroyuki Miyazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 13/962,339

(22) Filed: Aug. 8, 2013

(65) Prior Publication Data

US 2014/0054342 A1    Feb. 27, 2014

(30) Foreign Application Priority Data

Aug. 24, 2012  (JP) ................... 2012-185464

(51) Int. Cl.
*B62J 11/00*  (2006.01)
(52) U.S. Cl.
CPC ..................................... *B62J 11/005* (2013.01)
USPC .......................................................... 280/769
(58) Field of Classification Search
CPC ............................. B62J 11/005; A42B 3/0413
USPC .......................................... 280/769; 224/413
See application file for complete search history.

(56) References Cited

U.S. PATENT DOCUMENTS

| | | | | |
|---|---|---|---|---|
| 3,529,451 A * | 9/1970 | McOsker et al. | ................. | 70/59 |
| 3,779,597 A * | 12/1973 | Uchida | ...................... | 296/37.15 |
| 3,805,565 A * | 4/1974 | McLarnon | ........................ | 70/59 |
| 4,065,945 A * | 1/1978 | Jaulmes | ............................ | 70/58 |
| 4,096,715 A * | 6/1978 | Lipschutz | ......................... | 70/59 |
| 4,118,960 A * | 10/1978 | Lipschutz | ......................... | 70/59 |
| 4,201,398 A * | 5/1980 | Meier | ................................ | 70/59 |
| 4,274,271 A * | 6/1981 | Todd et al. | ....................... | 70/59 |
| 4,733,805 A * | 3/1988 | Sawada | ......................... | 224/440 |
| 5,025,883 A * | 6/1991 | Morinaka et al. | ............ | 180/219 |
| 7,661,280 B1 * | 2/2010 | Weyland | ......................... | 70/233 |
| 8,474,565 B2 * | 7/2013 | Harada | ......................... | 180/219 |
| 2008/0246315 A1 * | 10/2008 | Ito | ............................... | 297/215.1 |
| 2010/0287999 A1 * | 11/2010 | Huang | ............................... | 70/59 |
| 2012/0248733 A1 * | 10/2012 | Harada | ...................... | 280/281.1 |
| 2013/0168427 A1 * | 7/2013 | Visenzi | ......................... | 224/413 |

FOREIGN PATENT DOCUMENTS

| | | | | | |
|---|---|---|---|---|---|
| DE | 3141766 | * | 6/1982 | | |
| JP | 63-19393 | | 4/1988 | | |
| JP | 04342682 A | * | 11/1992 | .............. | B62J 11/00 |
| JP | 06255552 A | * | 9/1994 | .............. | B62J 11/00 |
| JP | 08040336 A | * | 2/1996 | .............. | B62J 11/00 |
| JP | 11227650 | * | 8/1999 | | |
| JP | 2006182130 A | * | 7/2006 | | |

* cited by examiner

*Primary Examiner* — Hau Phan
*Assistant Examiner* — Jacob Meyer
(74) *Attorney, Agent, or Firm* — Rankin, Hill & Clark LLP

(57) ABSTRACT

A saddle-ride type vehicle including grab rails that can be gripped by a pillion passenger seated on the pillion passenger seat and a helmet holder that allows selection between a lock state of a metal fitting of a chin strap of a helmet and an unlock state, and configured such that it is unlikely that the helmet holder prevents the pillion passenger from gripping the grab rails. A recess portion is formed in a grab rail, having its opening opened facing an attachment portion of a body frame for attachment of the grab rail. A helmet holder is provided at the position sandwiched between the grab rail and the attachment portion while having at least a part of the cylinder lock stored in the recess portion, and a key hole of the cylinder lock opened facing the outer surface of the grab rail.

20 Claims, 8 Drawing Sheets

HELMET HOLDER ATTACHMENT STRUCTURE OF SADDLE-RIDE TYPE VEHICLE

BACKGROUND OF THE INVENTION

The present invention relates to a saddle-ride type vehicle which includes a body frame that steerably bears a steering handlebar at a front end, a riding seat including a rider seat and a pillion passenger seat to the rear of the rider seat, which is supported at a rear part of the body frame, grab rails attached to the body frame at left and right sides of the pillion passenger seat so that the pillion passenger seated on the pillion passenger seat can grip those grab rails, and a helmet holder configured to have a holder body that includes and operates a slider movable between a lock position where a metal fitting of a chin strap of a helmet is retained and an unlock position where the lock state of the metal fitting is released. The holder body includes a cylinder lock for driving the slider from the lock position to the unlock position. More specifically, the present invention relates to improvement of a helmet holder attachment structure.

JP Examined Patent Application Publication No. S63-19393 discloses a structure that allows a helmet holder to be attached to one of the grab rails at both sides of the pillion passenger seat of the riding seat so as to cover an attachment portion at which the grab rails are attached to the body frame.

The helmet holder disclosed in JP Examined Patent Application Publication No. S63-19393 is attached to the outer surface of the grab rail, which may prevent the pillion passenger from gripping the grab rails. The helmet holder is provided at the accessible, conspicuous position, which may influence an external appearance of the saddle-ride type vehicle.

SUMMARY OF THE INVENTION

In view of the aforementioned circumstances, an object of the present invention is to provide a helmet holder attachment structure of a saddle-ride type vehicle, which is configured so that the helmet holder does not prevent the pillion passenger from gripping the grab rails, and its influence on the external appearance is avoidable.

In accordance with the present invention, a saddle-ride type vehicle includes a body frame that bears a steering handlebar steerably at a front end, a riding seat formed of a rider seat and a pillion passenger seat to the rear of the rider seat, which is supported at a rear part of the body frame, grab rails that are attached to the body frame at left and right sides of the pillion passenger seat, and allowed to be gripped by a pillion passenger seated on the pillion passenger seat, and a helmet holder configured to have a holder body that includes and makes a slider movable between a lock position in which a metal fitting of a chin strap of a helmet is retained and an unlock position in which the lock state of the metal fitting is released. The holder body includes a cylinder lock for driving the slider from the lock position to the unlock position. The grab rail has a recess portion that is opened facing a side of an attachment portion of the body frame for attachment of the grab rail. The helmet holder is provided at a position sandwiched between the grab rail and the attachment portion while having at least a part of the cylinder lock stored in the recess portion, and a key hole of the cylinder lock opened facing an outer surface of the grab rail. Therefore the helmet holder is covered with the grab rail from the outer side. It is unlikely that the helmet holder prevents the pillion passenger seated on the pillion passenger seat from gripping the grab rail. The helmet holder placed in an inconspicuous position may avoid influencing the external appearance of the saddle-ride type vehicle.

In further accordance with the present invention, the helmet holder is attached to the grab rail from a side of the attachment portion, and does not need any mount hole for attaching the helmet holder in the side of the body frame.

In further accordance with the present invention, the helmet holder is partially fitted with the recess portion with a non-circular shape. Even if the helmet holder is fastened to the grab rail only at the single position, the helmet holder will not be disengaged from the grab rail. This structure does not require a special stopper structure, thus reducing the number of parts.

In further accordance with the present invention, the grab rails penetrate through left and right sides of the riding seat, and are attached to the attachment portion of the body frame. The helmet holder is attached to the grab rail at the riding seat side so as to face the soft outer surface of the riding seat. This may protect the helmet retained by the helmet holder against damage.

In further accordance with the present invention, a front part of the grab rail is attached to the attachment portion of the body frame at a position corresponding to a rear end of the rider seat in a vehicular front-back direction. The helmet holder is attached to the front part of the grab rail. A non-detachable side trunk provided below the grab rail is supported with the body frame to the rear of a position corresponding to the rear end of the rider seat. The side trunk is provided below the grab rail, and allows the helmet retained by the helmet holder to be mounted on the side trunk, thus stabilizing the retained posture of the helmet.

In further accordance with the present invention, the side trunk includes a trunk body having a casing shape open to the outer side, which is fixed to the body frame, and a lid rotatably supported at a lower end of the trunk body so as to close an opening of the trunk body in an openable and closable manner. The helmet holder is attached to the grab rail to allow the helmet retained by the helmet holder to be mounted on the trunk body from above. The lid may be opened and closed even in the state where the helmet is retained by the helmet holder. It is unlikely that the helmet mounted on the trunk body interferes with loading or unloading of the luggage when the lid is opened.

In further accordance with the present invention, the grab rail includes a grip portion gripped by the pillion passenger seated on the pillion passenger seat, and an attachment extending portion which extends inward in a vehicular width direction from the grip portion, and is attached to the body frame. The attachment extending portion has the recess portion facing a side of the attachment portion of the body frame in the attachment extending portion. A through hole with which a cylinder portion of the cylinder lock is fitted is formed in the grab rail in an area between the outer surface and the recess portion. As a result, the cylinder portion may be entirely covered with the grab rail, and the opening of the key hole is made to face the outer surface of the grab rail. This makes it possible to avoid the adverse influence on usability.

DETAILED DESCRIPTION OF THE PREFERRED EMBODIMENTS

An embodiment according to the present invention will be described with reference to the accompanying FIGS. 1 to 9. It is to be noted that, throughout the description, references to directions, such as vertical and horizontal directions are made with reference to a rider of the motorcycle.

Figure 1:
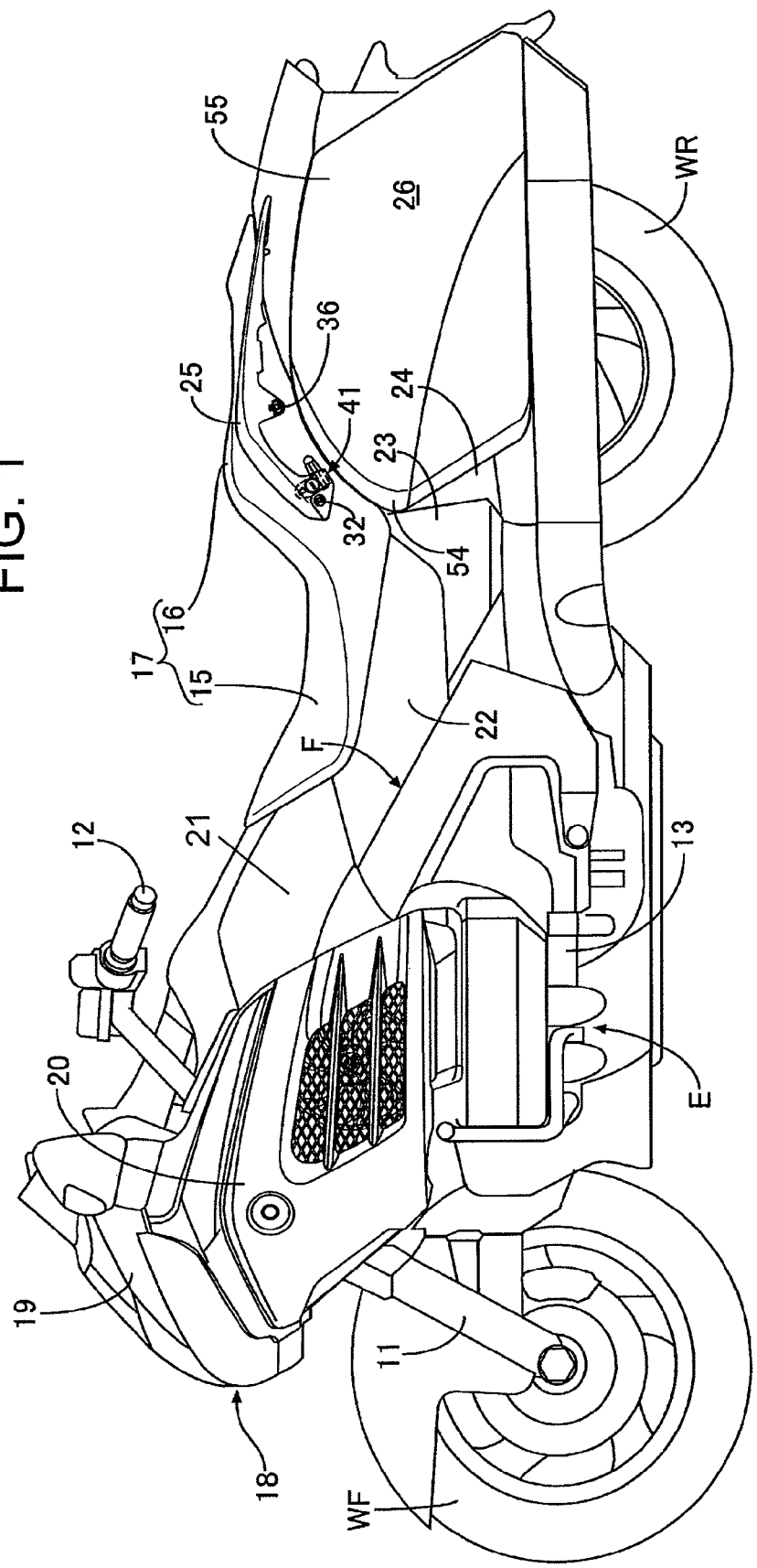
FIG. 1 is a left side view showing a motorcycle.

In FIG. 1, a front fork 11 to which a front wheel WF is journalled, and a bar-like steering handlebar 12 linked to the front fork 11 are steerably born to a front end of a body frame F of a motorcycle as the saddle-ride type vehicle. An engine body 13 of an engine E that generates power for driving a rear wheel WR suspended at a rear part of the body frame F is mounted thereon between the front wheel WF and the rear wheel WR.

A fuel tank (not shown) provided above the engine body 13 is supported with the body frame F. A tandem type riding seat 17 that includes a rider seat 15 and a pillion passenger seat 16 to the rear of the rider seat 15 is supported with the body frame F to the rear of the fuel tank.

The engine E that includes the fuel tank, and the body frame F are partially covered with a body cowl 18. The body cowl 18 includes a front cowl 19 that covers the front end of the body frame F above the front wheel WF from the front, side cowls 20 connected to left and right sides of the front cowl 19 so as to be positioned above the engine body 13, tank shelters 21 consecutively connected to rear parts of the side cowls 20 so as to cover the fuel tank provided to the front of the rider seat 15, left and right side covers 22 provided below the front part of the riding seat 17, and consecutively connected to the rear parts of the tank shelters 21, left and right seat cowls 23 consecutively connected to the side covers 22 so as to cover the rear lower part of the rider seat 15 from the side, and rear cowls 24 connected to the rear parts of the seat cowls 23.

Grab rails 25 that protrude upward from the left and right sides of the pillion passenger seat 16 of the tandem type riding seat 17 are supported with the rear part of the body frame F. Left and right non-detachable side trunks 26 provided below the rear part of the riding seat 17 are supported with the rear part of the body frame F so as to be opened and closed.

Figure 2:
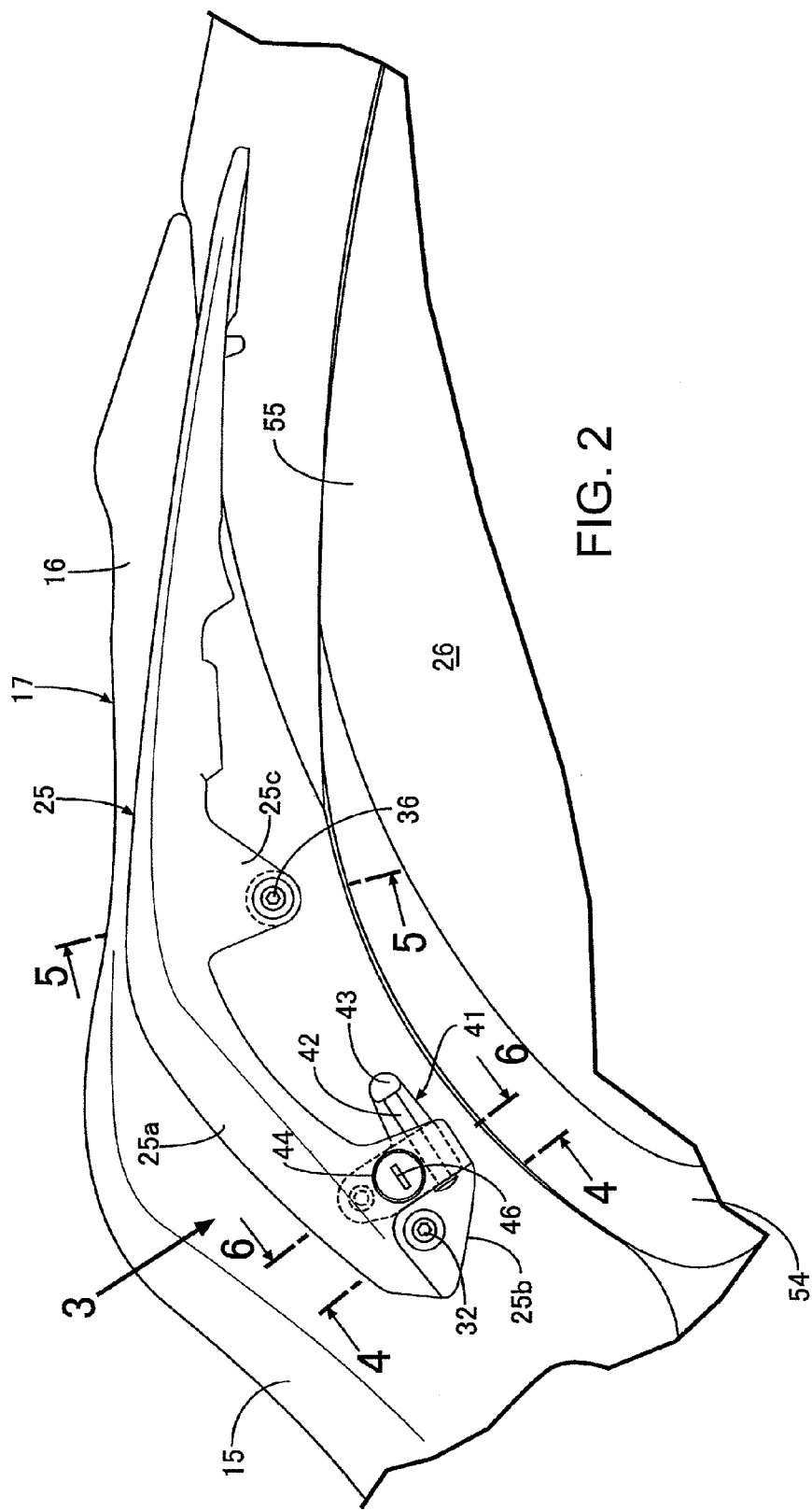
FIG. 2 is an enlarged view showing the essential parts of FIG. 1.
Figure 3:
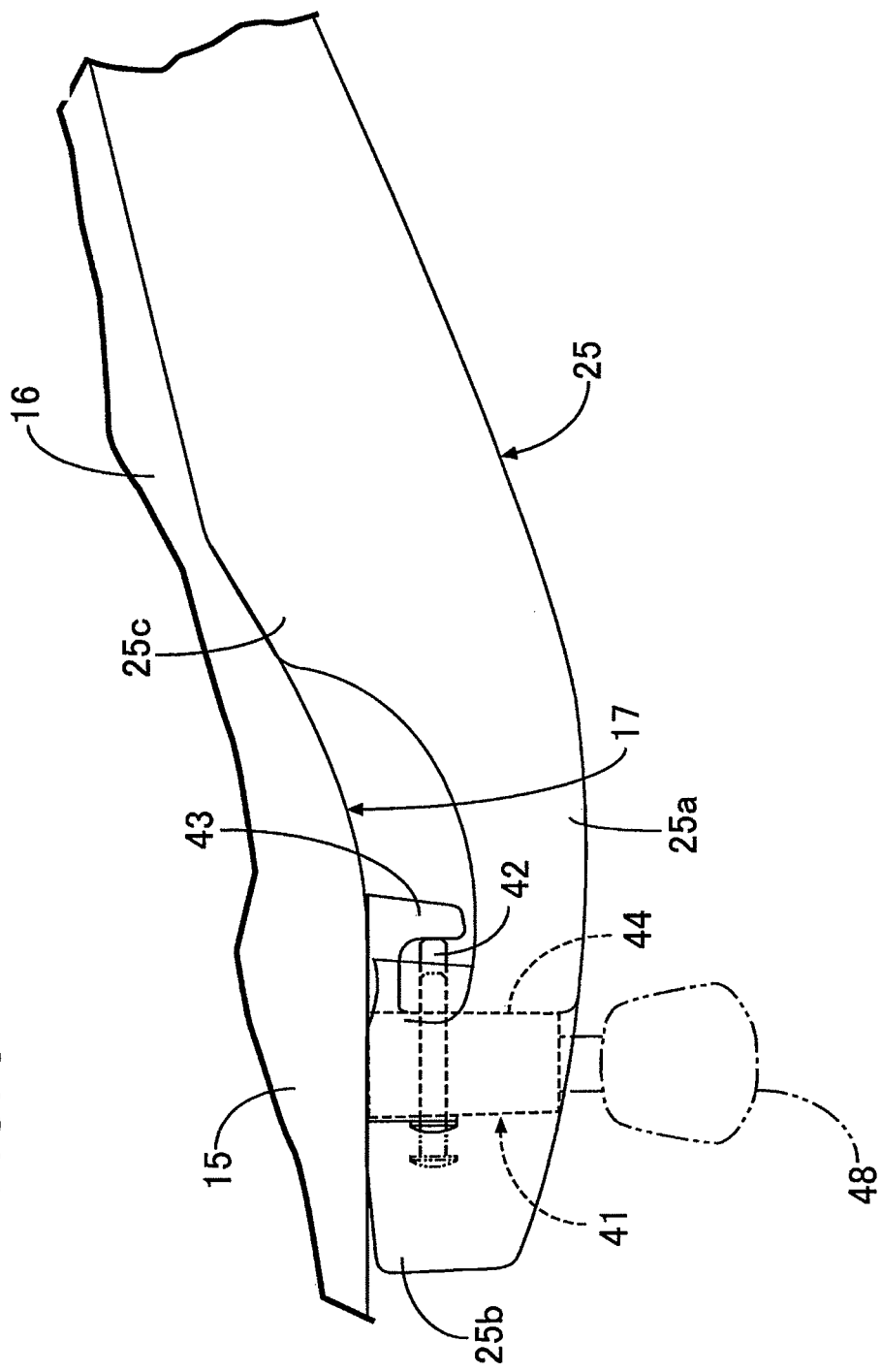
FIG. 3 is a view taken in a direction of an arrow 3 as shown in FIG. 2.

In FIGS. 2 and 3, the grab rail 25 includes a grip portion 25a at its front part, which can be gripped by the pillion passenger seated on the pillion passenger seat 16, a front attachment extending portion 25b extending inward and downward in the vehicular width direction from the front end of the grip portion 25a so as to be attached to the rear part of the body frame F, and a rear attachment extending portion 25c that extends inward and downward in the vehicular width direction from the rear end of the grip portion 25a so as to be attached to the rear part of the body frame F.

Figure 4:
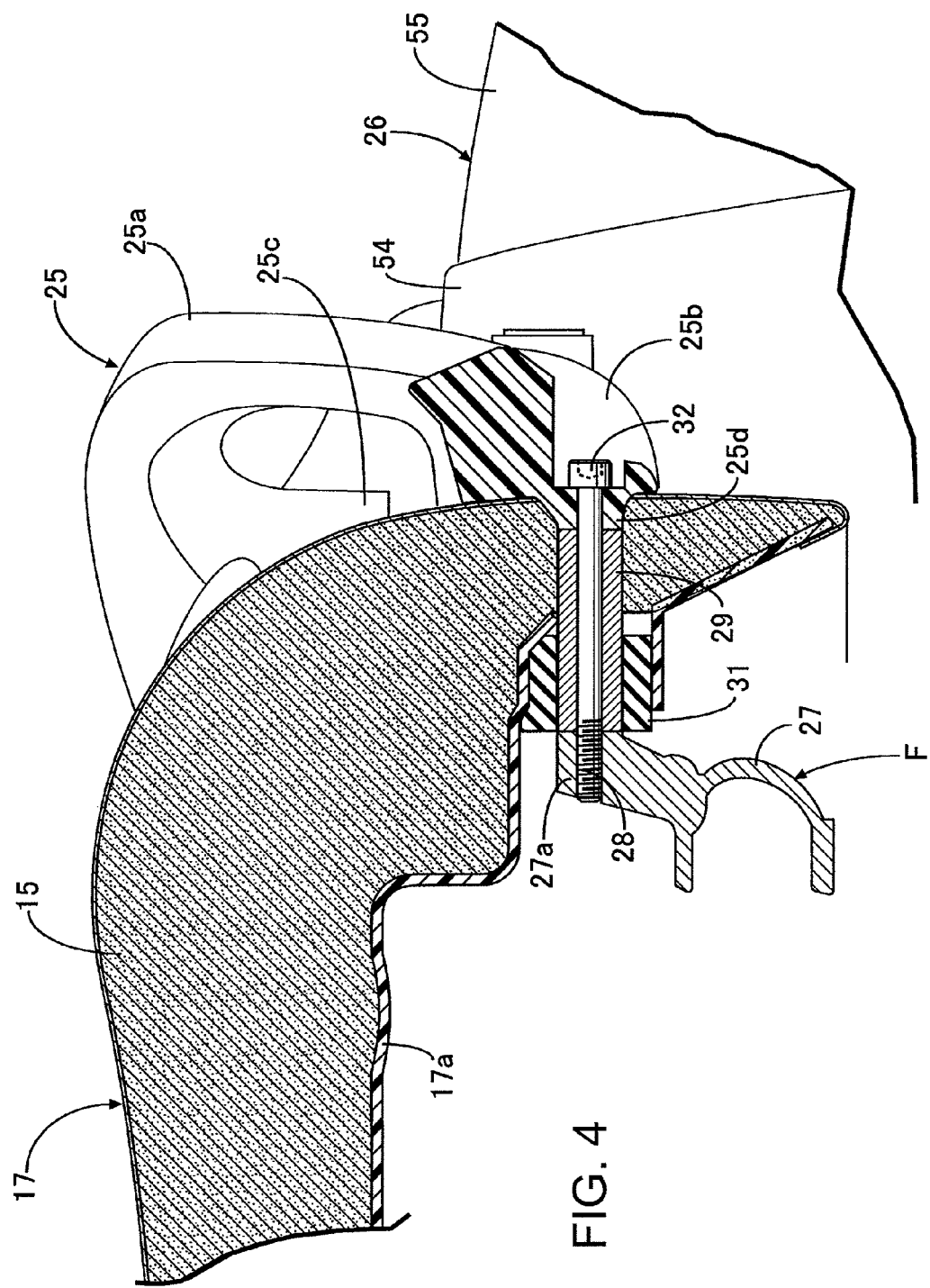
FIG. 4 is a sectional view taken along line 4-4 of FIG. 2.

In FIG. 4, left and right seat rails 27 below the riding seat 17 constitute a part of the body frame F and support the riding seat 17. The seat rail 27 is provided with a first attachment portion 27a with a screw hole 28 at the position corresponding to the rear end of the rider seat 15 in the vehicular front-back direction. The first attachment portion 27a is attached with the front attachment extending portion 25b of the grab rail 25. That is, each of the front attachment extending portions 25b of the left and right grab rails 25 is attached to the first attachment portion 27a at the position corresponding to the rear end of the rider seat 15 in the vehicular front-back direction. Furthermore, each of the front attachment extending portions 25b penetrating through the left and right sides of the riding seat 17 is attached to the first attachment portion 27a.

A short cylindrical first attachment tube 25d inserted into the side of the riding seat 17 is integrally attached to the front attachment extending portion 25b protrusively. A cylindrical elastic member 31 is inserted into a bottom plate 17a of the riding seat 17. A cylindrical collar 29 through which the side part of the riding seat 17 and the elastic member 31 are inserted is sandwiched between the first attachment tube 25d and the first attachment portion 27a attached to the seat rail 27 of the body frame F. A bolt 32 externally inserted into the first attachment tube 25d and the collar 29 is screwed with the screw hole 28 of the first attachment portion 27a so as to be fastened. Then the front attachment extending portion 25b of the grab rail 25 is attached to the first attachment portion 27a of the seat rail 27.

Figure 5:
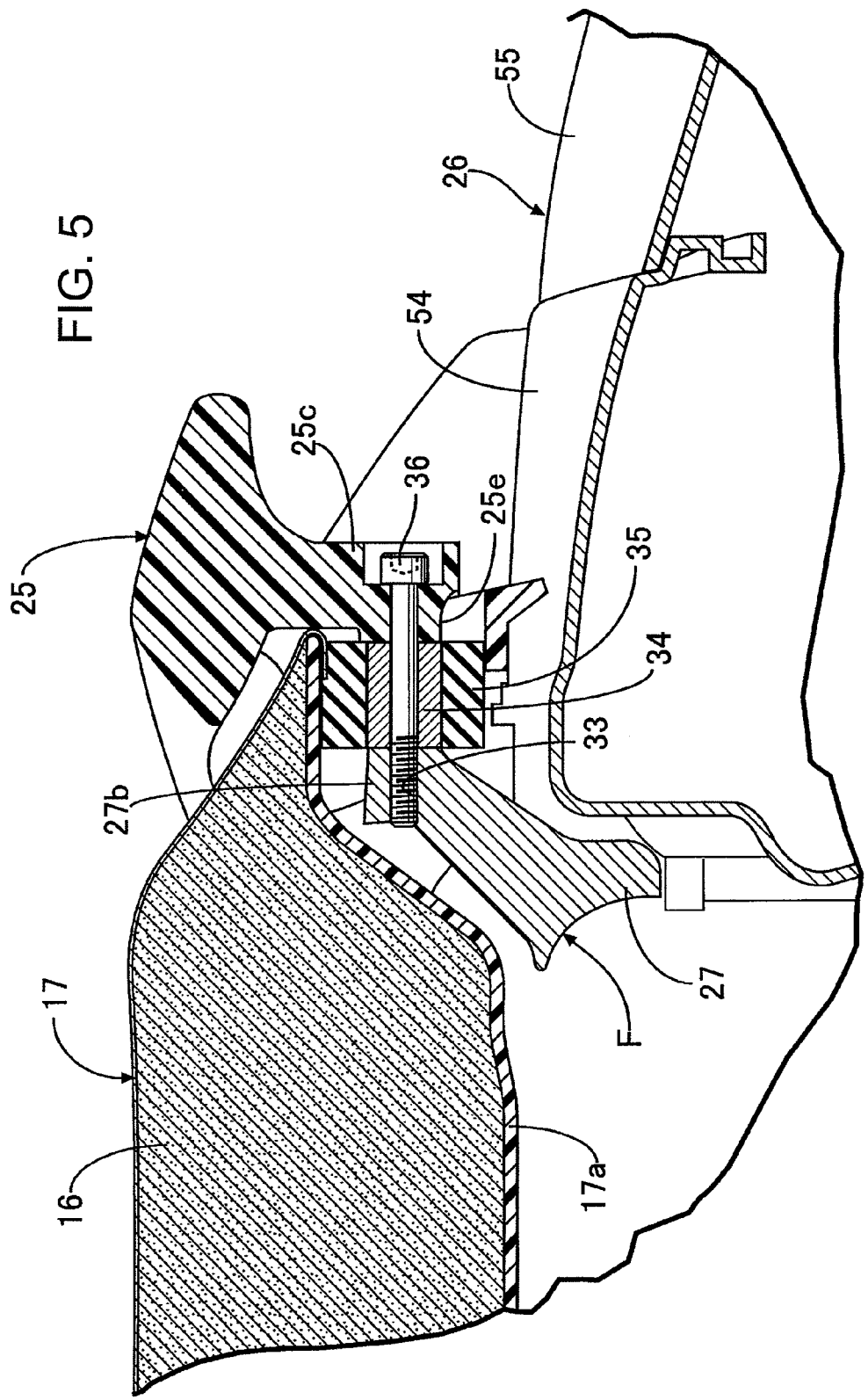
FIG. 5 is a sectional view taken along line 5-5 of FIG. 2.

Referring to FIG. 5, the seat rail 27 is provided with a second attachment portion 27b having a screw hole 33 and positioned to the rear of the first attachment portion 27a. The rear attachment extending portion 25c of the grab rail 25 is attached to the second attachment portion 27b so that the short cylindrical second attachment tube 25e is integrally attached to the rear attachment extending portion 25c protrusively.

A cylindrical collar 34 sandwiched between the second attachment portion 27b and the second attachment tube 25e is inserted into the bottom plate 17a of the riding seat 17 via a cylindrical elastic member 35. A bolt 36 externally inserted into the second attachment tube 25e and the collar 34 is screwed with the screw hole 33 so as to be fastened. Then the rear attachment extending portion 25c of the grab rail 25 is attached to the second attachment portion 27b of the seat rail 27 of the body frame F.

Figure 6:
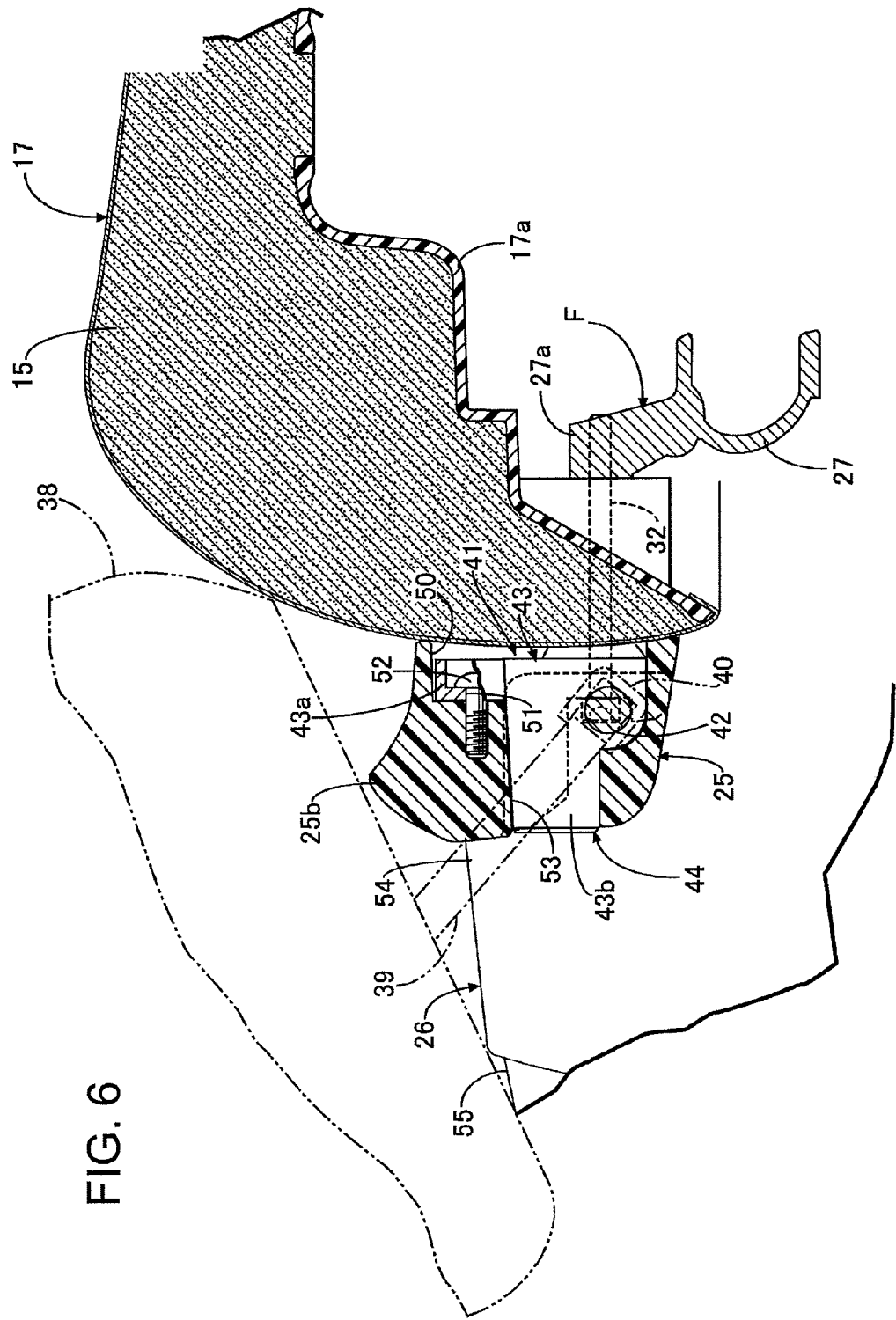
FIG. 6 is a sectional view taken along line 6-6 of FIG. 2.

In addition, referring to FIG. 6, a helmet holder 41 capable of retaining a metal fitting 40 of a chin strap 39 of a helmet 38 is provided between a front part of at least one of the left and right grab rails 25, the left grab rail 25 in this embodiment, and the first attachment portion 27a.

Figure 7:
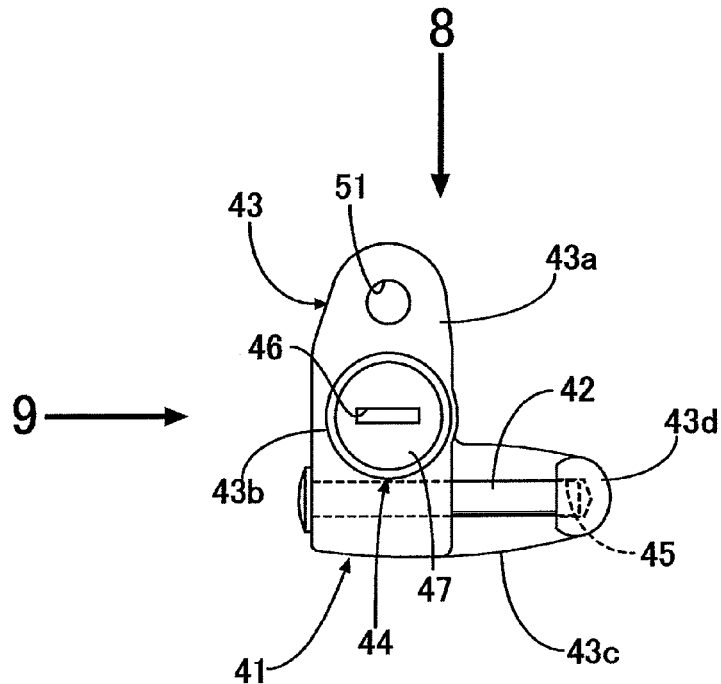
FIG. 7 is a side view showing a helmet holder.
Figure 8:
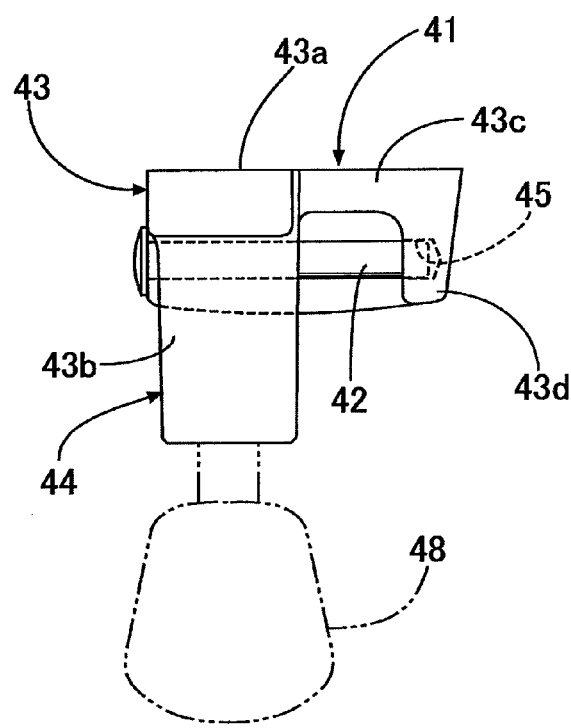
FIG. 8 is a view taken in the direction of an arrow 8 as shown in FIG. 7.
Figure 9:
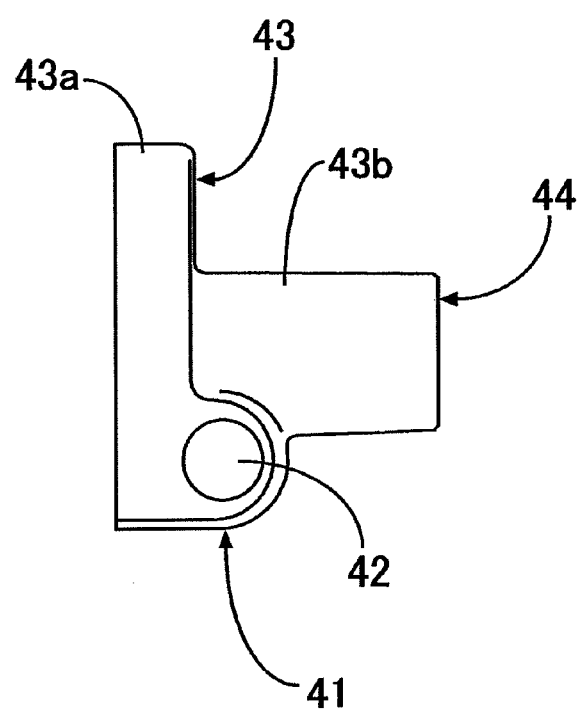
FIG. 9 is a view taken in the direction of an arrow 9 as shown in FIG. 7.

In addition, referring further to FIGS. 7 to 9, the helmet holder 41 is configured to have a holder body 43 which includes and makes a bar-like slider 42 movable between a lock position for retaining the metal fitting 40 and an unlock position for releasing the lock state of the metal fitting 40. The holder body 43 is provided with a cylinder lock 44 for driving the slider 42 from the lock position to the unlock position.

The holder body 43 is formed of an integral structure that is attached to the grab rail 25, which includes a main body 43a that vertically extends while being slightly inclined with a front part raised upward, a cylinder portion 43b consecutively connected perpendicularly to an intermediate portion of the main body 43a in the longitudinal direction, an arm portion 43c that has a base end portion consecutively connected to the lower part of the main body 43a while extending rearward, and a slider receiver portion 43d consecutively connected perpendicularly to the leading end of the arm portion 43c opposite the lower part of the main body 43a from the rear direction.

The slider 42 slidably penetrates through the lower part of the main body 43a while having one end made to face opposite the slider receiver portion 43d from the outer surface of the main body 43a. A bottomed fit hole 45, which can be slidably fitted with the other end of the slider 42, is formed in the slider receiver portion 43d.

The slider 42 is movable between the lock position where the other end of the slider 42 is fitted with the fit hole 45 of the slider receiver portion 43d and the unlock position where the other end of the slider 42 is released from the fit hole 45 so as to be separated from the slider receiver portion 43d by a predetermined interval. At the unlock position, one end of the slider 42 protrudes from the lower part of the main body 43a of the holder body 43 to the direction opposite the slider receiver portion 43d. When the slider 42 is at the unlock position, the metal fitting 40 is located between the other end portion of the slider 42 and the slider receiver portion 43d so that the one end of the slider 42 is depressed. Then the slider 42 moves to the lock position where the other end of the slider 42 penetrating through the metal fitting 40 fits with the fit hole 45, and the metal fitting 40 is retained.

Meanwhile, the cylinder lock 44 has a rotor 47 with a key hole 46 rotatably contained in the cylinder portion 43b. The rotor 47 is rotated by a mechanical key 48 inserted into the key hole 46 so as to drive the slider 42 from the lock position to the unlock position. This makes it possible to disengage the metal fitting 40 from the slider 42 at the unlock position.

Focusing on FIG. 6, a recess portion 50 that is opened facing the first attachment portion 27a of the seat rail 27 of the body frame F is formed in the front attachment extending portion 25b of the left grab rail 25. The helmet holder 41 is attached to the grab rail 25 at the position sandwiched between the grab rail 25 and the first attachment portion 27a, while having at least a part of the cylinder lock 44 stored in the recess portion 50, and the key hole 46 of the cylinder lock 44 opened facing the outer surface of the grab rail 25.

The recess portion 50 is configured to have a non-circular shape, and fitted with a part of the helmet holder 41. In this embodiment, the whole part of the main body 43a and a part of the cylinder portion 43b of the holder body 43 are fitted with the recess portion 50. In this fitted state, a screw member 52 inserted into a single insertion hole 51 formed in the main body 43a is screwed with the front attachment extending portion 25b. As a result, the helmet holder 41 is attached to the grab rail 25 from the first attachment portion 27a. In the state where the helmet holder 41 is attached to the front attachment extending portion 25b, the arm portion 43c and the slider receiver portion 43d of the holder body 43 of the helmet holder 41 are positioned to protrude rearward from the front attachment extending portion 25b.

A through hole 53 with which the cylinder portion 43b of the cylinder lock 44 is fitted is formed in the front attachment extending portion 25b of the grab rail 25 in an area between the outer surface and the recess portion 50.

The front part of the grab rail 25 is attached to the first attachment portion 27a of the seat rail 25 on the body frame F at the position corresponding to the rear end of the rider seat 15 in the vehicular front-back direction, and the helmet holder 41 is attached to the front part of the grab rail 25. The non-detachable side trunk 26 provided below the left grab rail 25 is supported with the rear part of the body frame F to the rear of the position corresponding to the rear end of the rider seat 15. This side trunk 26 is formed of a trunk body 54 which is shaped as a casing with an opening directed to the outer side, and fixed to the rear part of the body frame F, and a lid 55 rotatably supported with the lower end of the trunk body 54 so as to close the opening of the trunk body 54 in the openable/closable manner.

The helmet holder 41 is attached to the front part of the left grab rail 25 so that the helmet 38 retained by the helmet holder 41 is mounted on the trunk body 54 from above, as shown in FIG. 6.

Operations of the embodiment will be described. The left one of the grab rails 25 provided at left and right sides of the pillion passenger seat 16 of the riding seat 17 has the recess portion 50 that is opened facing the first attachment portion 27a attached to the seat rail 27 of the body frame F for attachment of the grab rails 25. The helmet holder 41 is provided at the position sandwiched between the grab rail 25 and the first attachment portion 27a while having at least a part of the cylinder lock 44 stored in the recess portion 50, and the key hole 46 of the cylinder lock 44 opened facing the outer surface of the grab rail 25. As a result, the helmet holder 41 is covered with the grab rails 25 from the outer side. It is unlikely that the helmet holder 41 prevents the pillion passenger seated on the pillion passenger seat 16 from gripping the grab rails 25. The helmet holder 41 is provided at the inconspicuous position, thus avoiding influence on the external appearance of the motorcycle.

The helmet holder 41 is attached to the grab rail 25 from the side of the first attachment portion 27a, which does not require formation of the mount hole for attaching the helmet holder 41 in the body frame F.

The recess portion 50 has the non-circular shape, with which the helmet holder 41 is partially fitted. This structure prevents the helmet holder 41 from being disengaged from the grab rail 25 even if the helmet holder 41 is fastened to the grab rail 25 only at the single point. Furthermore, this makes it possible to reduce the number of parts by eliminating the need of the special stopper structure.

The grab rails 25 penetrate through the left and right sides of the riding seat 17, and are attached to the first attachment portions 27a of the body frame F. The helmet holder 41 attached to the grab rail 25 at the side of the riding seat 17 is positioned facing the soft outer surface thereof. Therefore, the helmet 38 retained by the helmet holder 41 is protected against damage.

The front part of the grab rail 25 is attached to the first attachment portion 27a of the body frame F at the position corresponding to the rear end of the rider seat 15 in the vehicular front-back direction. The helmet holder 41 is attached to the front part of the grab rail 25. The non-detachable side trunk 26 below the grab rail 25 is supported with the body frame F while being provided to the rear of the position corresponding to the rear end of the rider seat 15. This allows the helmet 38 retained by the helmet holder 41 to be mounted on the side trunk 26, stabilizing the retained posture of the helmet 38.

The side trunk 26 includes the trunk body 54 formed as the casing open to the outer side, which is fixed to the body frame F, and the lid 55 rotatably supported with the lower end of the trunk body 54 so as to close the opening of the trunk body 54 in the openable/closable manner. The helmet holder 41 is attached to the grab rail 25 so that the helmet 38 retained by the helmet holder 41 is mounted on the trunk body 54 from above. This makes it possible to open and close the lid 55 even in the state where the helmet 38 is retained by the helmet holder 41. Accordingly, it is unlikely that the helmet 38 mounted on the trunk body 54 interferes with loading and unloading of the luggage when the lid 55 is opened.

The grab rail 25 includes the grip portion 25a gripped by the pillion passenger seated on the pillion passenger seat 16, and the front attachment extending portion 25b which extends inward in the vehicular width direction from the grip portion 25a, and is attached to the first attachment portion 27a of the body frame F. The recess portion 50 opened facing the first attachment portion 27a is formed in the front attachment extending portion 25b. The through hole 53 with which the cylinder portion 43b of the cylinder lock 44 is fitted is formed in the grab rail 25 in the area between the outer surface and the recess portion 50. This allows the grab rail 25 to entirely cover the cylinder portion 43b. The opening of the key hole 46 is opened facing the outer surface of the grab rail 25 so as to avoid adverse influence on usability.

Up to this point the embodiment according to the present invention has been described, but the present invention is not limited to the aforementioned embodiment and various changes in design can be made without departing from the invention as set forth in the claims.

REFERENCE SIGNS LIST

12 ... Steering handlebar
15 ... Rider seat
16 ... Pillion passenger seat
17 ... Riding seat
25 ... Grab rail
25a ... Grip portion
25b ... Front attachment extending portion as attachment extending portion
26 ... Side trunk
27a ... Attachment portion
38 ... Helmet
39 ... Chin strap
40 ... Metal fitting
42 ... Slider
43 ... Holder body
43b ... Cylinder portion
44 ... Cylinder lock
46 ... Key hole
50 ... Recess portion
53 ... Through hole
54 ... Trunk body
55 ... Lid
F ... Body frame

What is claimed is:

1. A helmet holder attachment structure of a saddle-ride type vehicle comprising: a body frame that bears a steering handlebar steerably at a front end; a riding seat formed of a rider seat and a pillion passenger seat to the rear of the rider seat, which is supported at a rear part of the body frame; grab rails which are attached to the body frame at left and right sides of the pillion passenger seat, and allowed to be gripped by a pillion passenger seated on the pillion passenger seat; and a helmet holder configured to have a holder body that includes and makes a slider movable between a lock position where a metal fitting of a chin strap of a helmet is retained and an unlock position where the lock state of the metal fitting is released, the holder body including a cylinder lock for driving the slider from the lock position to the unlock position,
wherein the grab rail has a recess portion that is opened facing a side of an attachment portion of the body frame for attachment of the grab rail, and
the helmet holder is provided at a position sandwiched between the grab rail and the attachment portion while having at least a part of the cylinder lock stored in the recess portion, and a key hole of the cylinder lock opened facing an outer surface of the grab rail.

2. The helmet holder attachment structure of a saddle-ride type vehicle according to claim 1, wherein the helmet holder is attached to the grab rail from a side of the attachment portion.

3. The helmet holder attachment structure of a saddle-ride type vehicle according to claim 1, wherein the helmet holder is partially fitted with the recess portion with a non-circular shape.

4. The helmet holder attachment structure of a saddle-ride type vehicle according to claim 1, wherein the grab rails penetrate through left and right sides of the riding seat, and are attached to the attachment portion of the body frame.

5. The helmet holder attachment structure of a saddle-ride type vehicle according to claim 4, wherein:
a front part of the grab rail is attached to the attachment portion of the body frame at a position corresponding to a rear end of the rider seat in a vehicular front-back direction;
the helmet holder is attached to the front part of the grab rail; and
a non-detachable side trunk provided below the grab rail is supported with the body frame to the rear of a position corresponding to the rear end of the rider seat.

6. The helmet holder attachment structure of a saddle-ride type vehicle according to claim 5, wherein:
the side trunk includes a trunk body having a casing shape open to the outer side, which is fixed to the body frame, and a lid rotatably supported at a lower end of the trunk body so as to close an opening of the trunk body in an openable and closable manner; and
the helmet holder is attached to the grab rail to allow the helmet retained by the helmet holder to be mounted on the trunk body from above.

7. The helmet holder attachment structure of a saddle-ride type vehicle according to claim 1, wherein:
the grab rail includes a grip portion gripped by the pillion passenger seated on the pillion passenger seat, and an attachment extending portion which extends inward in a vehicular width direction from the grip portion, and is attached to the body frame;
the attachment extending portion has the recess portion facing a side of the attachment portion of the body frame; and
a through hole with which a cylinder portion of the cylinder lock is fitted is formed in the grab rail in an area between the outer surface and the recess portion.

8. The helmet holder attachment structure of a saddle-ride type vehicle according to claim 2, wherein the helmet holder is partially fitted with the recess portion with a non-circular shape.

9. The helmet holder attachment structure of a saddle-ride type vehicle according to claim 2, wherein the grab rails penetrate through left and right sides of the riding seat, and are attached to the attachment portion of the body frame.

10. The helmet holder attachment structure of a saddle-ride type vehicle according to claim 3, wherein the grab rails penetrate through left and right sides of the riding seat, and are attached to the attachment portion of the body frame.

11. The helmet holder attachment structure of a saddle-ride type vehicle according to claim 2, wherein:
the grab rail includes a grip portion gripped by the pillion passenger seated on the pillion passenger seat, and an attachment extending portion which extends inward in a vehicular width direction from the grip portion, and is attached to the body frame;
the attachment extending portion has the recess portion facing a side of the attachment portion of the body frame; and
a through hole with which a cylinder portion of the cylinder lock is fitted is formed in the grab rail in an area between the outer surface and the recess portion.

12. The helmet holder attachment structure of a saddle-ride type vehicle according to claim 3, wherein:
the grab rail includes a grip portion gripped by the pillion passenger seated on the pillion passenger seat, and an attachment extending portion which extends inward in a vehicular width direction from the grip portion, and is attached to the body frame;
the attachment extending portion has the recess portion facing a side of the attachment portion of the body frame; and
a through hole with which a cylinder portion of the cylinder lock is fitted is formed in the grab rail in an area between the outer surface and the recess portion.

13. The helmet holder attachment structure of a saddle-ride type vehicle according to claim 4, wherein:
the grab rail includes a grip portion gripped by the pillion passenger seated on the pillion passenger seat, and an attachment extending portion which extends inward in a vehicular width direction from the grip portion, and is attached to the body frame;
the attachment extending portion has the recess portion facing a side of the attachment portion of the body frame; and
a through hole with which a cylinder portion of the cylinder lock is fitted is formed in the grab rail in an area between the outer surface and the recess portion.

14. The helmet holder attachment structure of a saddle-ride type vehicle according to claim 5, wherein:
the grab rail includes a grip portion gripped by the pillion passenger seated on the pillion passenger seat, and an attachment extending portion which extends inward in a vehicular width direction from the grip portion, and is attached to the body frame;
the attachment extending portion has the recess portion facing a side of the attachment portion of the body frame; and
a through hole with which a cylinder portion of the cylinder lock is fitted is formed in the grab rail in an area between the outer surface and the recess portion.

15. The helmet holder attachment structure of a saddle-ride type vehicle according to claim 6, wherein:
the grab rail includes a grip portion gripped by the pillion passenger seated on the pillion passenger seat, and an attachment extending portion which extends inward in a vehicular width direction from the grip portion, and is attached to the body frame;
the attachment extending portion has the recess portion facing a side of the attachment portion of the body frame; and
a through hole with which a cylinder portion of the cylinder lock is fitted is formed in the grab rail in an area between the outer surface and the recess portion.

16. The helmet holder attachment structure of a saddle-ride type vehicle according to claim 9, wherein:
a front part of the grab rail is attached to the attachment portion of the body frame at a position corresponding to a rear end of the rider seat in a vehicular front-back direction;
the helmet holder is attached to the front part of the grab rail; and
a non-detachable side trunk provided below the grab rail is supported with the body frame to the rear of a position corresponding to the rear end of the rider seat.

17. The helmet holder attachment structure of a saddle-ride type vehicle according to claim 16, wherein:
the side trunk includes a trunk body having a casing shape open to the outer side, which is fixed to the body frame, and a lid rotatably supported at a lower end of the trunk body so as to close an opening of the trunk body in an openable and closable manner; and
the helmet holder is attached to the grab rail to allow the helmet retained by the helmet holder to be mounted on the trunk body from above.

18. The helmet holder attachment structure of a saddle-ride type vehicle according to claim 10, wherein:
a front part of the grab rail is attached to the attachment portion of the body frame at a position corresponding to a rear end of the rider seat in a vehicular front-back direction;
the helmet holder is attached to the front part of the grab rail; and
a non-detachable side trunk provided below the grab rail is supported with the body frame to the rear of a position corresponding to the rear end of the rider seat.

19. The helmet holder attachment structure of a saddle-ride type vehicle according to claim 18, wherein:
the side trunk includes a trunk body having a casing shape open to the outer side, which is fixed to the body frame, and a lid rotatably supported at a lower end of the trunk body so as to close an opening of the trunk body in an openable and closable manner; and
the helmet holder is attached to the grab rail to allow the helmet retained by the helmet holder to be mounted on the trunk body from above.

20. The helmet holder attachment structure of a saddle-ride type vehicle according to claim 19, wherein:
the grab rail includes a grip portion gripped by the pillion passenger seated on the pillion passenger seat, and an attachment extending portion which extends inward in a vehicular width direction from the grip portion, and is attached to the body frame;
the attachment extending portion has the recess portion facing a side of the attachment portion of the body frame; and
a through hole with which a cylinder portion of the cylinder lock is fitted is formed in the grab rail in an area between the outer surface and the recess portion.

\* \* \* \* \*